Dec. 4, 1945.   H. HITCHEN   2,390,304
MEANS FOR DETERMINING AND RECORDING THE
STRESSES IN WIRE ROPES, CHAINS, ETC
Filed Aug. 23, 1944   2 Sheets-Sheet 1
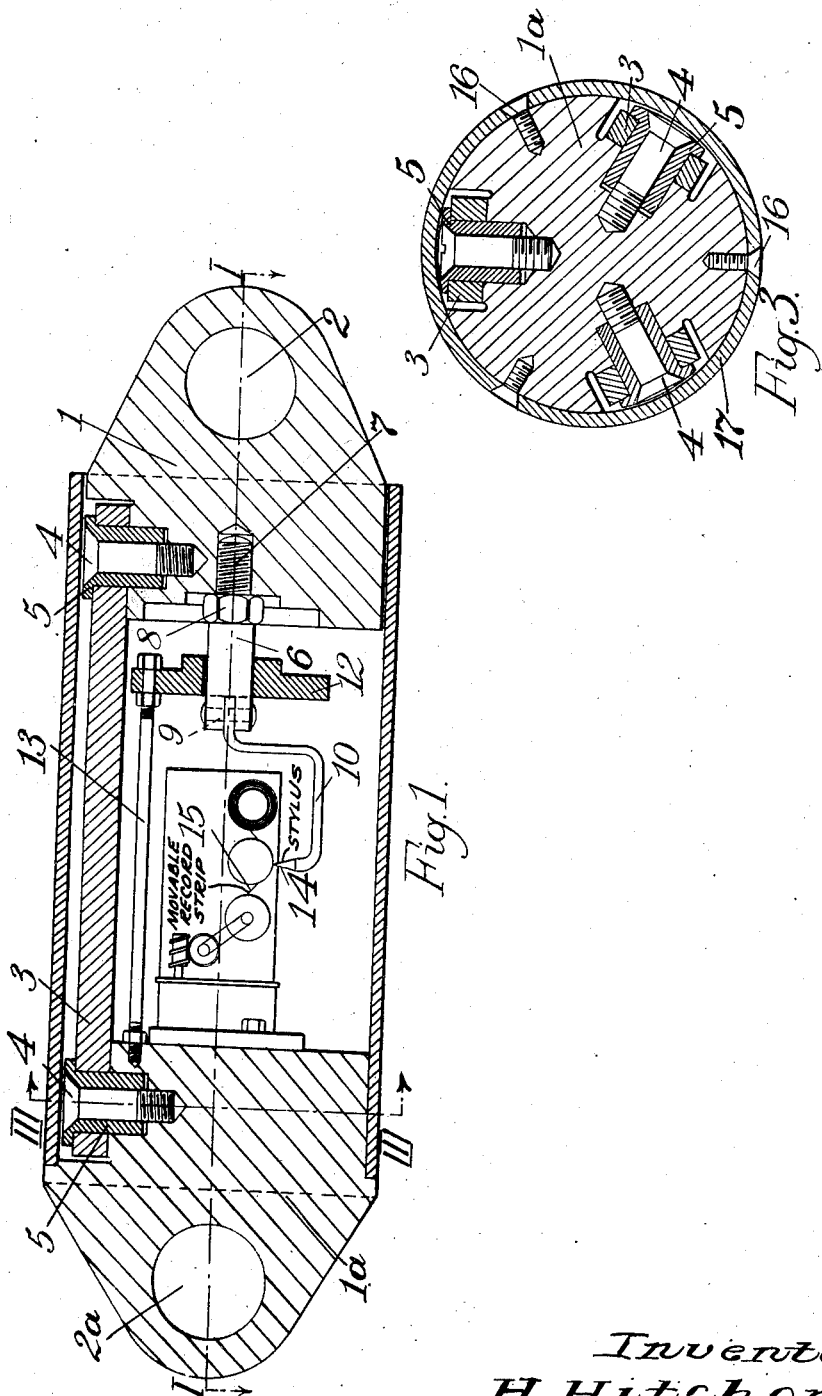
Inventor
H. Hitchen

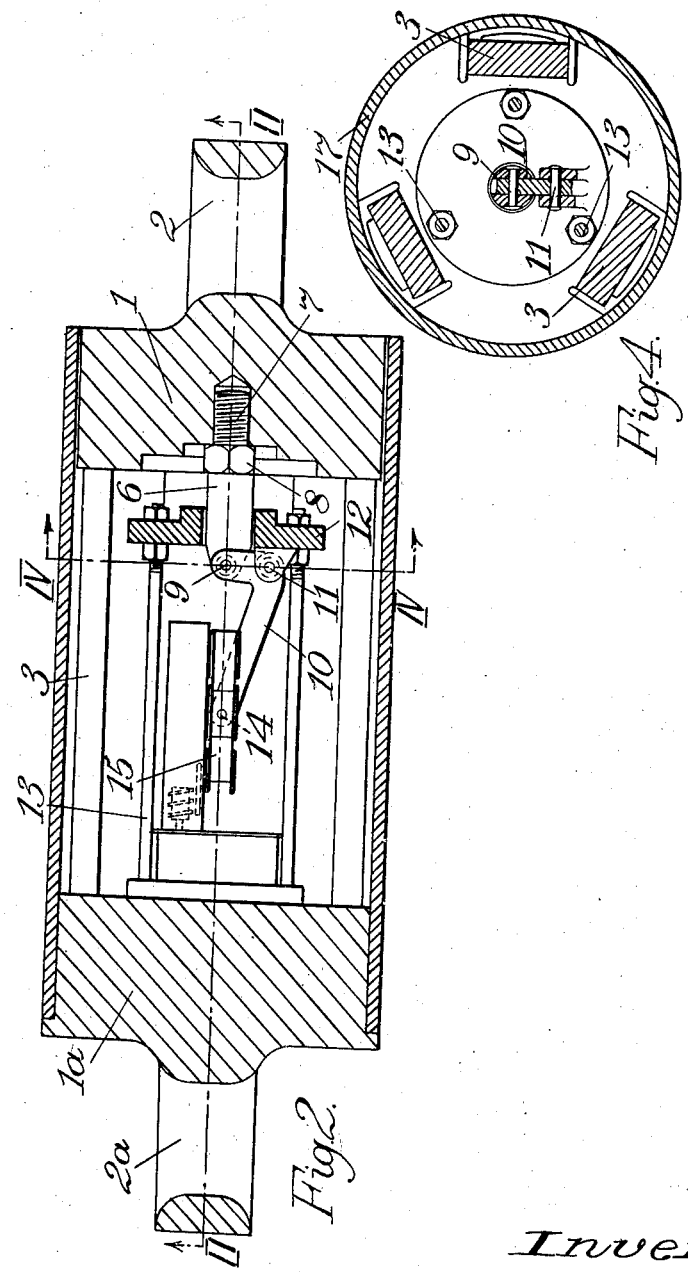

Patented Dec. 4, 1945

2,390,304

UNITED STATES PATENT OFFICE 2,390,304

MEANS FOR DETERMINING AND RECORDING THE STRESSES IN WIRE ROPES, CHAINS, ETC.

Herbert Hitchen, Doncaster, England, assignor to British Ropes Limited, Doncaster, England Application August 23, 1944, Serial No. 550,804
In Great Britain June 18, 1943

3 Claims. (Cl. 73—141)

This invention relates to means for determining or recording the stresses in wire ropes, chains and the like, and has for its object to provide an element which may function as an anchoring means or otherwise as a link in the connection between a rope and the point to which it is anchored or the load with which it is connected.

The invention consists, broadly, in a link adapted to withstand a given maximum load to which it is designed to be subjected with a suitable factor of safety, associated with means whereby variation in the distance between two points in its length due to elongation under loading is applied through amplifying or multiplying mechanism in indicating or recording the degree or variation in degree of loading.

Thus, for instance, in accordance with the invention, the means in question may comprise a light rod connected at one of its ends to one of the fixed points of the link and at the other end with a light lever pivoted to the other of the fixed points and adapted directly or through suitable mechanism to impart motion to a stylus operating upon a travelling band on which a record of the variation in loading will be formed.

The recording device may be one employing a film operating in accordance with the "stylus on Celluloid" method of recording.

The link may be a rigid element furnished with eyes or equivalent means by which connection may be made between it and anchoring means and the rope or chain, or alternatively, between the rope or chain and the load, or it may be a plurality of bars arranged parallel, each of such bars being connected at one end with a member furnished with an eye or the like by which, in turn, connection may be secured with an anchoring point, the other ends of the bars being similarly secured to a member adapted to be connected with the rope or chain.

With such an arrangement the rods may be arranged parallel and form a frame or cage surrounding a member of greater rigidity which, however, does not operate to carry the load but merely operates to prevent the bars being displaced. In other words, it gives longitudinal rigidity to the frame or cage.

Alternatively, the member associated with means whereby its variation in length with variation in loading is applied in indicating or recording such variation, may be a tube in which case with the eyes or the like to which it is connected there may be associated a rigid rod located within the tube and secured to one of the members furnished with an eye or the like and slidable in a socket provided in the other of the members furnished with an eye or the like in order to give longitudinal rigidity to the whole device in preventing bending or similar distortion of the tube.

The invention will be described further in detail and by way of example with reference to the accompanying drawings in which:

Figures 1 and 2 are views in sectional elevation of the device in planes indicated by the line II—II and I—I respectively and as viewed in the direction of the arrows;

Figure 3 is a view in cross-section on the line III—III of Figure 1;

Figure 4 is a view in section on the line IV—IV of Figure 2.

As shown in the drawings the device comprises two end members 1, 1a provided respectively with holes 2, 2a by which the device may be secured to an anchoring point and the end of a rope in which stresses are to be determined, 3 are bars connecting the two end members being secured thereto by screws 4 passing through bushings 5 engaging in recesses in the end members.

To the end member 1 there is secured a pin 6 provided with a screw-threaded portion 7 by which it is engaged in the member and associated with a locking nut 8.

To the pin there is connected by a pivot 9 one arm of a bell crank lever 10 fulcrumed on a pin 11 by which it is secured to the plate 12 connected by rods 13 with the end member 1a.

The end of the other arm of the lever is formed or provided with a spherical ended recording needle or stylus 14 which will be displaced from its initial or normal position according to the tension set up in the bars 3, in such manner as to give graphic indications on a Celluloid film 15 by plastic deformation thereof, so that when viewed by transmitted parallel light with a microscope properly focussed, the indentations formed in the film will show as a narrow sharply defined dark band on a bright ground, with a still finer bright line in the centre of the dark band, measurements of the magnified record thus obtained or by photographic enlargements can be secured with a high degree of accuracy.

The method of and means for forming a record on a transparent Celluloid film, as above described, is known, see British specification No. 195,116, and is described in the above detailed description as an example of indicating and recording means suitable for the purpose of the invention.

In the construction described access may be had to the recording means by removing the screws 16 and sliding the casing 17 axially.

I claim:

1. Means for determining stresses in strand materials, comprising end members, connecting means retaining the end members in spaced relation, a bell-crank lever having one of its arms pivoted to one of the end members and having the free end of its other arm mounted to swing in a direction angularly of the direction of loading stress, and a plate supported horizontally by the other end member in close proximity to the pivoted lever arm and connected with the lever adjacent its pivot, whereby upon relative movement of the end members the lever is caused to swing about its pivotal axis.

2. An arrangement as claimed in claim 1 wherein said connecting means is constituted by strips having aperture ends, bushings inserted in said ends and means passing through said bushings securing the strips to the end members.

3. An arrangement as claimed in claim 1 wherein the free end of the lever is provided with a terminal stylus, and in which there are means supporting a movable record strip over which the stylus is movable.

HERBERT HITCHEN.